(12) United States Patent
Fitton et al.

(10) Patent No.: US 8,548,078 B1
(45) Date of Patent: Oct. 1, 2013

(54) RANGING CODE DETECTION

(75) Inventors: Michael Fitton, London (GB);
Kulwinder Dhanoa, Old Windsor (GB);
Mehul Mehta, Reading (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/349,973

(22) Filed: Jan. 13, 2012

Related U.S. Application Data

(63) Continuation of application No. 11/588,099, filed on Oct. 25, 2006, now Pat. No. 8,121,203.

(51) Int. Cl.
*H04K 1/10* (2006.01)

(52) U.S. Cl.
USPC ........... 375/260; 375/299; 375/349; 375/347; 375/343

(58) Field of Classification Search
USPC .................. 375/260, 299, 267, 349, 347, 343
See application file for complete search history.

(56) References Cited

U.S. PATENT DOCUMENTS

| | | | |
|---|---|---|---|
| 2002/0126618 A1 | 9/2002 | Kim | |
| 2003/0053626 A1* | 3/2003 | Van Veldhoven et al. | 380/46 |
| 2005/0063480 A1 | 3/2005 | Sang et al. | |
| 2005/0117539 A1* | 6/2005 | Song et al. | 370/328 |
| 2005/0141474 A1 | 6/2005 | Lee et al. | |
| 2006/0098749 A1 | 5/2006 | Sung et al. | |
| 2006/0193392 A1 | 8/2006 | Kim et al. | |
| 2007/0133697 A1 | 6/2007 | Spock et al. | |

OTHER PUBLICATIONS

Yaghoobi, Hassan; "Scalable OFDMA Physical Layer in IEEE 802.16 WirelessMAN"; 2004, Intel Technology Journal, vol. 8, No. 3, pp. 201-212.

* cited by examiner

*Primary Examiner* — Kabir A Timory
(74) *Attorney, Agent, or Firm* — Ropes & Gray LLP

(57) ABSTRACT

A ranging code present in a transmission from a transmitter to a receiver can be detected, and hence a time offset can be determined. For each of the possible ranging codes in a transmitted signal, a correlation is formed between a received signal and the ranging code for multiple subcarriers in the received signal. For multiple adjacent ranging subcarriers, the correlation is multiplied by a conjugate of the correlation of an adjacent ranging subcarrier in order to form a differential phase value. At least one ranging code in the transmitted signal can then be determined based on the differential phase values for said plurality of subcarriers. A time offset in the transmission from the transmitter to the receiver can then be determined, based on the differential phase values for the subcarriers, and based on the determined ranging code.

18 Claims, 7 Drawing Sheets

RANGING CODE DETECTION

CROSS-REFERENCE TO RELATED APPLICATIONS

This application is a continuation of, and claims the benefit of and priority to, U.S. patent application Ser. No. 11/588,099, filed Oct. 25, 2006 and currently pending, which is incorporated herein by reference in its entirety.

BACKGROUND OF THE INVENTION

This invention relates to a method for detection of a ranging code, and to an apparatus implementing the method.

In wireless communications systems, an Orthogonal Frequency Division Multiplexed (OFDM) system is one in which a transmitter sends data to a receiver using a number of different subcarrier frequencies within a transmission frequency band. The receiver then has to detect the data transmitted on each of the carrier frequencies, in order to be able to recreate the original transmitted signal.

In an Orthogonal Frequency Division Multiple Access (OFDMA) system, there may be multiple users, transmitting data to a single receiver. One such system is the so-called WiMAX system, specified in the IEEE 802.16e standard, in which a number of users are able to communicate with an access point. As the users are able to move within the coverage area of the access point, this allows the users to have high data rate wireless access to a communications network while moving.

In the IEEE 802.16e system, the available subcarriers are divided into subchannels, and each of the users can be allocated one or more of the subchannels. It is then the function of a base station to receive transmissions from the users, which may be transmitting simultaneously, and to detect and decode those transmissions. One factor, which must be taken into consideration by the base station, is that the users may be located at different distances from the base station, and therefore signals transmitted from those users will take different lengths of time to reach the base station. In order to be able to handle the transmissions from such users, the base station needs to be able to determine the distances of the users from the base station, and hence the times taken for their transmissions to reach the base station, in order to be able to achieve proper synchronization of operation.

In order to allow the base station to makes these determinations, the user devices transmit ranging codes in a specified ranging subchannel, either when the user device is initially trying to connect to the base station, or periodically thereafter in order to take account of movement of the user device relative to the base station. By detecting the received ranging code, the base station is able to synchronize to subsequent transmissions from that user device.

SUMMARY OF THE INVENTION

According to an aspect of the invention, a ranging code present in a transmission from a transmitter to a receiver can be detected, and hence a time offset can be determined. For each of the possible ranging codes in a transmitted signal, a correlation is formed between a received signal and the ranging code for multiple subcarriers in the received signal. For multiple adjacent ranging subcarriers, the correlation is multiplied by a conjugate of the correlation of an adjacent ranging subcarrier in order to form a differential phase value. At least one ranging code in the transmitted signal can then be determined based on the differential phase values for said plurality of subcarriers. A time offset in the transmission from the transmitter to the receiver can then be determined, based on the differential phase values for the subcarriers, and based on the determined ranging code.

According to another aspect of the invention, there is provided a method of generating a required ranging code, wherein the required ranging code forms part of a specific one of a plurality of groups of ranging codes, the groups of ranging codes together forming a set of available ranging codes, and the method comprising:

on initialization of a device, applying an initialization sequence to a shift register of a pseudorandom sequence generator;

clocking bits through said shift register to generate said set of available ranging codes;

during said clocking bits through said shift register, storing bits present in said shift register at a start of a first ranging code in each of said groups of ranging codes; and when a required ranging code is identified:

applying to said shift register the stored bits present in said shift register at the start of the first ranging code in said specific one of said plurality of groups of ranging codes; and clocking bits through said shift register to generate the ranging codes of said specific one of said plurality of groups of ranging codes.

DETAILED DESCRIPTION OF PREFERRED EMBODIMENTS

Figure 1:
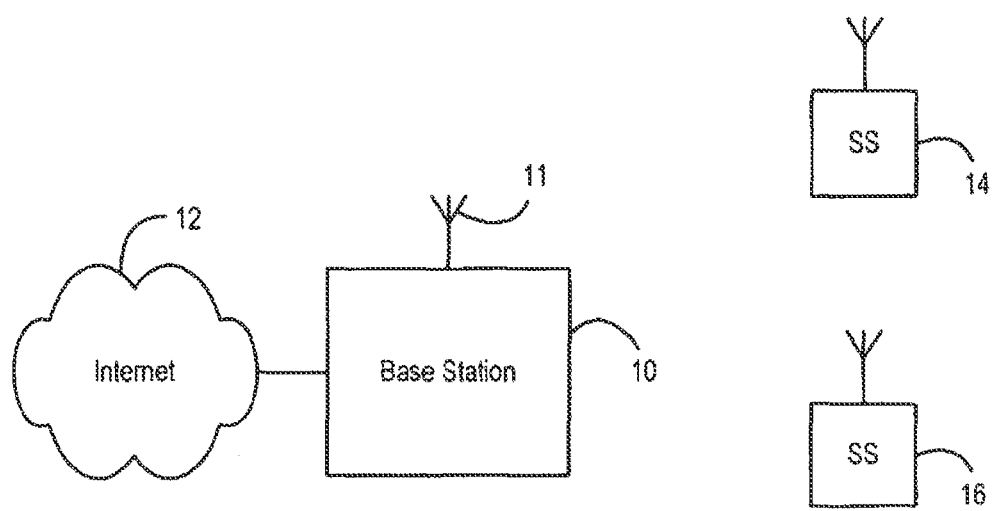
FIG. 1 is a block schematic diagram of a wireless communications system in accordance with the present invention.

FIG. 1 is a schematic representation of a wireless communications system incorporating the present invention. In this illustrated embodiment, the wireless communications system is a WiMAX system, operating in accordance with the IEEE 802.16e standard.

A base station 10, with an antenna 11 for transmitting and receiving wireless signals, also has a connection to a computer network, such as the internet 12. Subscriber stations (SS) 14, 16 are then able to move in the area around the base station 10 and communicate with the base station 10 over a wireless connection, in order to be able to connect to the internet 12. It will be appreciated that, although two subscriber stations 14, 16 are shown in FIG. 1, there may be any number of such subscriber stations.

The WiMAX system is an Orthogonal Frequency Division Multiple Access (OFDMA) system, in which the available frequency band is divided into a number of subcarriers, and data can be transmitted on each of these subcarriers. The subcarriers are grouped into subchannels, and, in each OFDM symbol period, each of the multiple users 14, 16 is allocated at least one of the subchannels, on which it can transmit data to the receiver 10. Thus, the subscriber stations can be transmitting data simultaneously to the base station 10.

Figure 2:
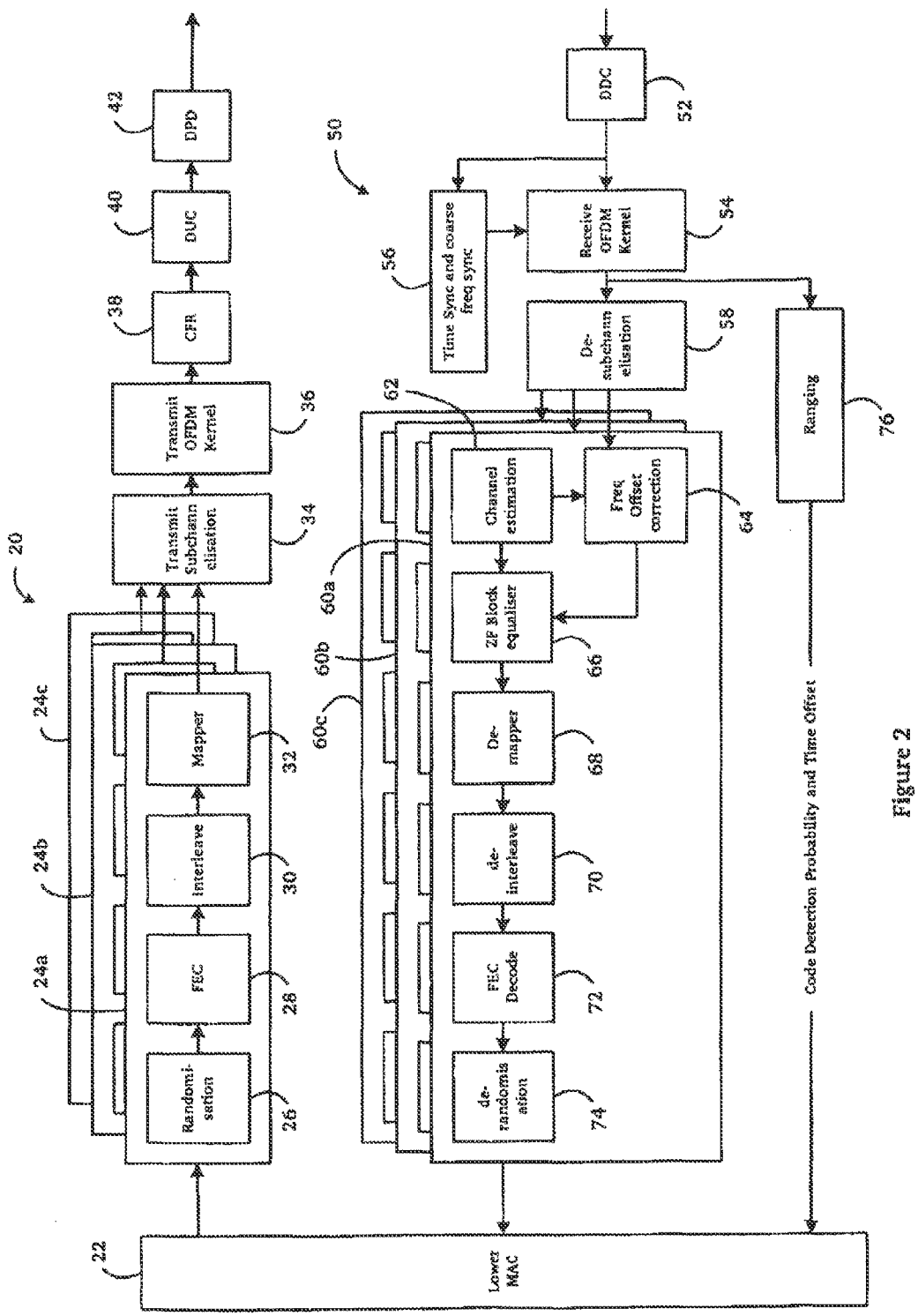
FIG. 2 is a more detailed block schematic diagram of a base station in the wireless communications system of FIG. 1.

FIG. 2 is a more detailed illustration of parts of the base station 10. Except as described in more detail below, the base station is generally conventional, and its operation will be understood by the person of ordinary skill in the art.

Briefly, however, in the transmit path 20 of the base station 10, data for transmission to each of the active subscriber stations 14, 16 is passed from the lower Media Access Control (MAC) block 22 to a respective data handling block 24a, 24b, 24c, each of which includes a respective randomisation block 26, Forward Error Correction (FEC) coding block 28, interleaver 30, and mapper 32. Although three data handling blocks are shown in FIG. 2, it will be appreciated that there may be any number of such blocks. The data from the data handling blocks 24a, 24b, 24c is then passed to a transmit subchannelization block 34, and to a transmit OFDM kernel 36.

The data is then passed to a crest factor reduction (CFR) block 38, digital upconverter (DUC) 40 and digital predistortion (DPD) block 42, before being passed to a power amplifier and antenna (not shown) for transmission over the air interface, and for reception by the relevant subscriber stations.

In the receive path 50 of the base station 10, signals from the antenna (not shown) are passed to a digital downconverter (DDC) 52, and then to a receive OFDM kernel 54. At the same time, the output signals from the DDC 52 are passed to a time synchronization and coarse frequency synchronization block 56, and the synchronization output from this block is also passed to the OFDM kernel 54. The OFDM kernel 54 includes a Fast Fourier Transform (FFT) block, for converting the received signal from the time domain to the frequency domain. That is, the output of the FFT block contains information about the signals received on each of the subcarriers making up the OFDM signal.

The output from the OFDM kernel 54 is passed to a de-subchannelization block 58, for separation of the subcarriers into the subchannels. The data on each of the subchannels is then passed to a respective signal detection block 60a, 60b, 60c, each of which includes a channel estimation block 62, frequency offset correction block 64, zero-forcing (ZF) block equalizer 66, de-mapper 68, de-interleaver 70, Forward Error Correction (FEC) decoder 72 and de-randomization black 74. The outputs from the signal detection blocks 60a, 60b, 60c are then passed to the lower Media Access Control (MAC) block 22.

Since the subscriber stations 14, 16 may be located at different distances from the base station 10, signals transmitted from those subscriber stations during the same OFDM symbol period will then be received at the base station 10 at different times. The IEEE 802.16e standard therefore allows for the transmission by the subscriber stations 14, 16 of ranging codes. More specifically, the standard specifies 256 different ranging codes, each having 144 bits. When a subscriber station is first connecting to the WiMAX system, or is first connecting to a base station during a handover procedure, or is contending for extra bandwidth, or at periodic intervals during a connection, the subscriber station transmits one of the ranging codes on a ranging subchannel which includes 144 subcarriers.

Figure 3:
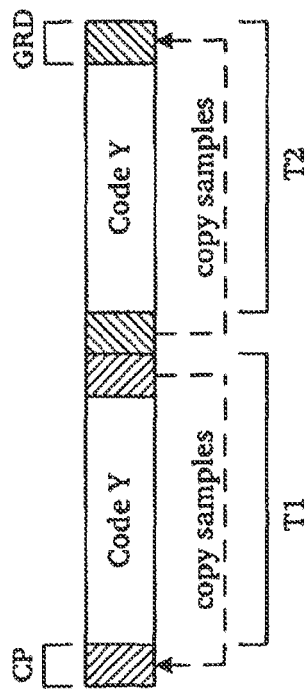
FIG. 3 illustrates the form of a ranging signal transmitted in the wireless communications system of FIG. 1.

FIG. 3 illustrates the transmission of a ranging code from a subscriber station during initial ranging. Specifically, during one OFDM symbol period T1, a ranging code is transmitted on the subcarriers of the ranging subchannel. Of the specified ranging codes, some are allocated to initial ranging, and the subscriber selects one of these allocated ranging codes (indicated in FIG. 3 as Code Y) at random. As is conventional in OFDM systems, a portion of the samples from the end of the signal transmitted during the OFDM symbol period T1 are also transmitted at the start of the OFDM symbol period T1 as a cyclic prefix (CP). During the next OFDM symbol period T2, the same ranging code (Code Y) is transmitted on the subcarriers of the ranging subchannel. A portion of the samples from the start of the signal transmitted during the OFDM symbol period T2 are also transmitted during a guard interval (GRD) at the end of the OFDM symbol period T2.

Figure 4:
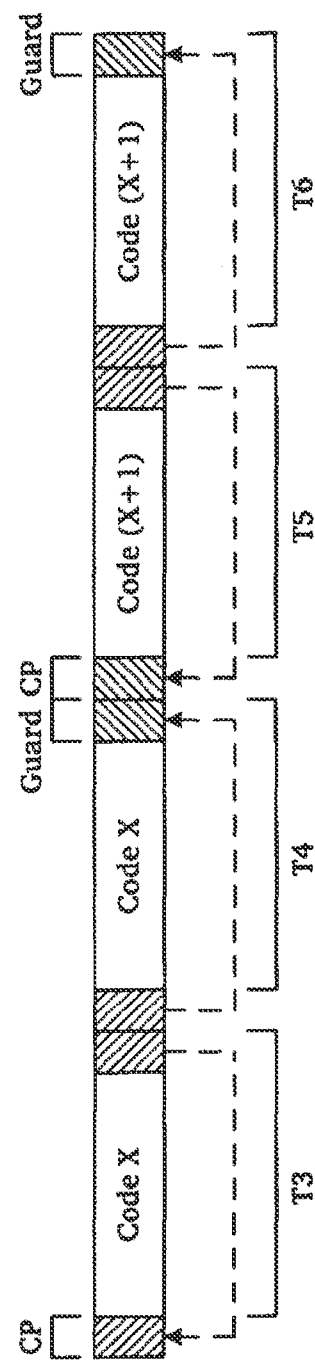
FIG. 4 illustrates an alternative form of the ranging signal transmitted in the wireless communications system of FIG. 1.

FIG. 4 illustrates an alternative form of the transmission of a ranging code from a subscriber station during initial ranging. Specifically, in this case, during one OFDM symbol period T3, a randomly selected one of the ranging codes allocated to initial ranging (indicated in FIG. 4 as Code X) is transmitted on the subcarriers of the ranging subchannel. Again, a portion of the samples from the end of the signal transmitted during the OFDM symbol period T3 are also transmitted at the start of the OFDM symbol period T3 as a cyclic prefix (CP). During the next OFDM symbol period T4, the same ranging code (Code X) is transmitted on the subcarriers of the ranging subchannel. A portion of the samples from the start of the signal transmitted during the OFDM symbol period T4 are also transmitted during a guard interval (GRD) at the end of the OFDM symbol period T4.

In this case, however, during the next OFDM symbol period T5, the next one of the ranging codes allocated to initial ranging (that is, Code X+1) is transmitted on the subcarriers of the ranging subchannel. Again, a portion of the samples from the end of the signal transmitted during the OFDM symbol period T5 are also transmitted at the start of the OFDM symbol period T5 as a cyclic prefix (CP). During the next OFDM symbol period T6, the same ranging code (Code X+1) is transmitted on the subcarriers of the ranging subchannel. A portion of the samples from the start of the signal transmitted during the OFDM symbol period T6 are also transmitted during a guard interval (GRD) at the end of the OFDM symbol period T6.

In either case, as will be described in more detail below, the receiver detects the presence of the ranging code in the received signals, and is then able to synchronize to the transmissions from that subscriber station.

Specifically, the output from the OFDM kernel 54 is also passed to a ranging block 76, which determines the time offsets in the signals received from the subscriber stations 14, 16. The output from the ranging block 76 is passed to the lower Media Access Control (MAC) block 22.

Although FIGS. 3 and 4 illustrate the transmission of ranging codes during initial ranging, it is will be clear that the requirement to detect a ranging code, and to use this to determine a time offset in a transmission, is the same during periodic, bandwidth and handover ranging.

Figure 5:
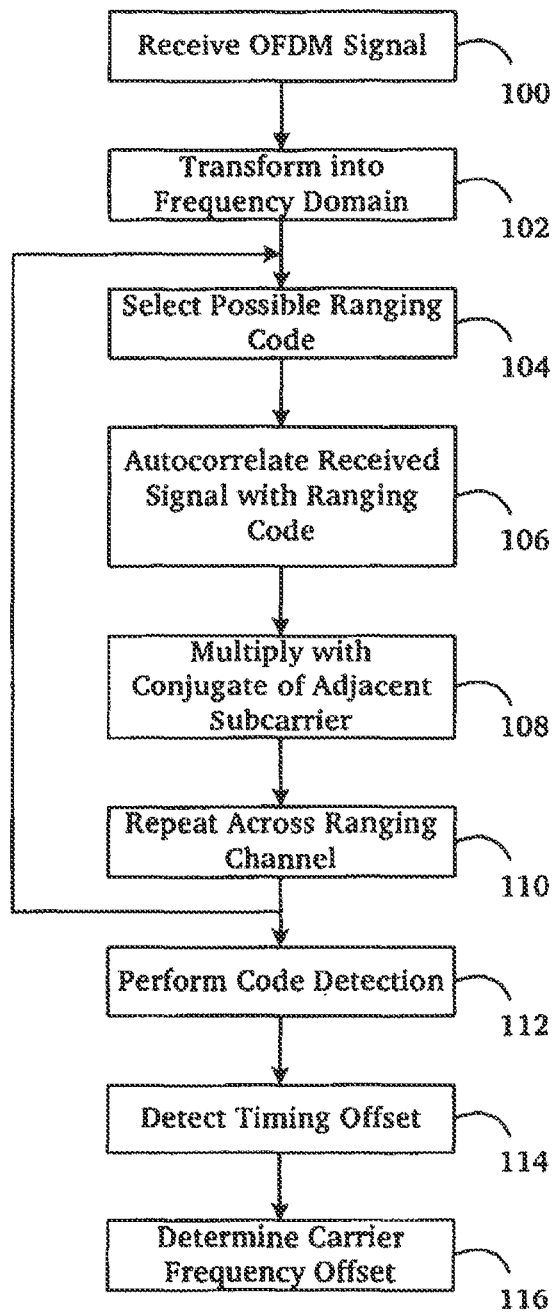
FIG. 5 is a flow chart, illustrating a method in accordance with an aspect of the present invention.

FIG. 5 is a flow chart, illustrating the procedure carried out in the receive path 50, and in particular in the ranging block 76.

In step 100 of the procedure, the OFDM signal is received and, in step 102, it is transformed into the frequency domain by the FFT block in the receive OFDM kernel 54.

The method proceeds from the recognition that, when a received ranging code is correlated in turn with the possible transmitted ranging codes, the magnitude of the correlation will be greatest when the received ranging code is correlated with the actually transmitted ranging code. Moreover, the propagation time delay of the transmitted ranging code will add a phase delay to the received signal, and the amount of the phase delay will vary from one subcarrier to the next, because a constant time corresponds to a varying phase angle as the subcarrier frequency varies. The present invention therefore uses the difference in the phase angle, between two subcarrier frequencies, as a measure of the time delay.

In step 104 of the method, therefore, one of the possible transmitted ranging codes is selected.

The IEEE 802.16e standard specifies 256 different ranging codes, each having 144 bits. Of these specified ranging codes, a subset are available to each base station, and, of these available ranging codes, some are for use as initial ranging codes, some are available for use as periodic ranging codes, some are available for use for bandwidth requests, and some are available for use for handover ranging. The generation of the ranging codes will now be described in more detail, with particular reference to the situation where the ranging codes are 144 bits long. However, it will be apparent that the same technique for generating ranging codes can be applied to any desired code length.

Figure 6:
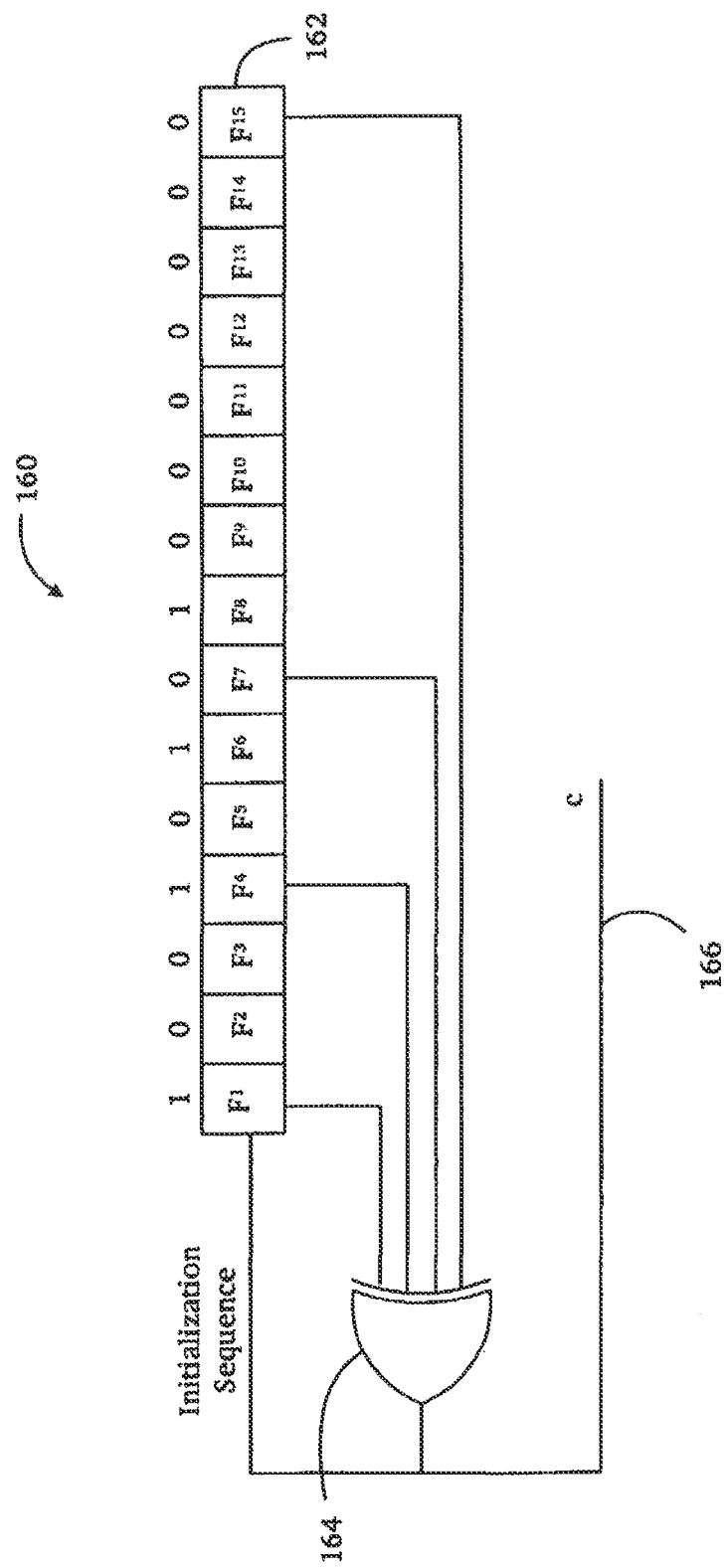
FIG. 6 is a block schematic diagram illustrating a component in the base station of FIG. 2.

These ranging codes are defined by means of a pseudorandom sequence generator, as shown in FIG. 6. As is generally known in the art, the pseudorandom sequence generator 160 includes a shift register 162 comprising a number of logic devices, in this case fifteen flip-flops $F_1, F_2, F_3, \ldots, F_{15}$. Starting from an initialization sequence of fifteen bits, applied to the fifteen flip-flops $F_1, F_2, F_3, \ldots, F_{15}$, a sequence of output bits are generated. Specifically, during each clock period, the binary values stored in four of the flip-flops, namely the flip-flops $F_1, F_4, F_7$, and $F_{15}$, are supplied to the inputs of an OR gate 164.

The output of the OR gate 164 is then supplied as an output bit c on the output line 164, and is also fed back to the first flip-flop $F_1$ of the shift register 162. Meanwhile, each of the bits stored in the flip-flops $F_2, F_2, F_3, \ldots, F_{15}$ is passed to the next flip-flop in the shift register 162.

The pseudorandom sequence generator 160 therefore generates a sequence of output bits c. Each successive group of 144 consecutive output bits forms one of the ranging codes in the set of ranging codes specified in the standard.

In order to allow the base station to generate a desired ranging code, one possibility would be provide an initialization sequence, and then clock through the codes until the desired code is reached. However, this may take an undesirably long time before reaching the desired code. Alternatively, it would be possible to store the bits stored in the shift register 162 at the start of all of the specified ranging codes, or at least at the start of all of the subset of ranging codes available to that base station. However, this would require relatively large amounts of memory.

Figure 7:
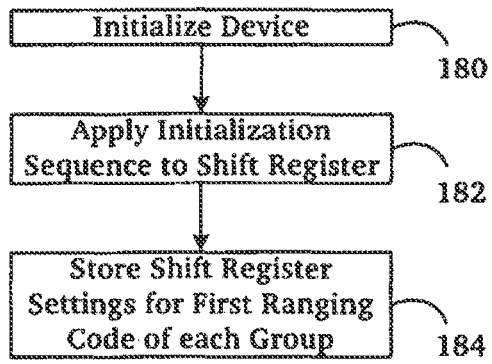
FIG. 7 is a flow chart illustrating a use of the component shown in FIG. 6.

FIG. 7 illustrates the operation of the pseudorandom sequence generator 160 in the preferred embodiment of this invention. Specifically, in step 180, the device is first powered up, and then, in step 182, the initialization sequence is applied to the shift register 162, as shown in FIG. 6. As mentioned above, this causes the complete set of ranging codes to be generated, in sequence. During this operation, the device notes and stores four shift register settings, namely those at the start of the first initial ranging code, at the start of the first periodic ranging code, at the start of the first ranging code for bandwidth requests, and at the start of the first handover ranging code. This is shown as step 184 in the flow chart of FIG. 7.

Figure 8:
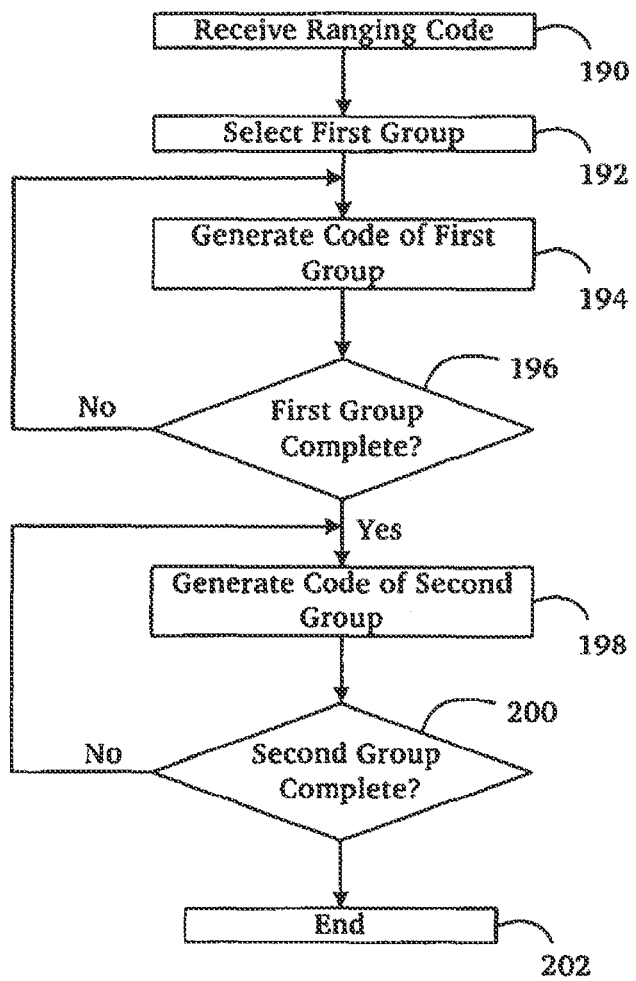
FIG. 8 is a flow chart illustrating a further use of the component shown in FIG. 6.

FIG. 8 is a flow chart illustrating the generation of the ranging codes during the receiver operation. Specifically, in subsequent use of the device, the base station may receive a ranging code during a time slot that is reserved for initial ranging or handover ranging. Alternatively, the base station may receive a ranging code during a time slot that is reserved for periodic ranging or bandwidth contention ranging. In either case, this is shown as step 190 in FIG. 8.

The process then passes to step 192, in which one of the groups of ranging codes is selected. Where the ranging code was received during a time slot reserved for initial ranging or handover ranging, then either the group of initial ranging codes or the group of handover ranging codes may be selected. The selection may be predetermined, or may be configurable. Similarly, where the ranging code was received during a time slot reserved for periodic ranging or bandwidth contention ranging, then either the group of periodic ranging codes or the group of bandwidth contention ranging codes may be selected. Again, the selection may be predetermined, or may be configurable.

In step 194, the stored shift register setting, associated with the first ranging code in the selected group, is applied to the fifteen flip-flops $F_1, F_2, F_3, \ldots, F_{15}$ of the shift register 162. As described above, the next 144 bits output from the pseudorandom sequence generator 160 form the first ranging code in the selected group. When a ranging code has been generated, the process passes to step 196, in which it is determined whether all of the ranging codes in the first selected group have been generated. If not, the process returns to step 194, in which the next 144 bits are output from the pseudorandom sequence generator 160 to form the next ranging code in the selected group, and then to step 196.

When it is determined in step 196 that the first selected group is complete, that is, that all of the codes in that group have been generated, then the process passes to step 198. Where the ranging code was received during a time slot reserved for initial ranging or handover ranging, and one of these groups of codes was selected as the first group in step 192, the other becomes the second group. Similarly, where the ranging code was received during a time slot reserved for periodic ranging or bandwidth contention ranging, and one of these groups of codes was selected as the first group in step 192, the other becomes the second group.

In step 198, the stored shift register setting, associated with the first ranging code in the second group, is applied to the fifteen flip-flops $F_1, F_2, F_3, \ldots, F_{15}$ of the shift register 162. As described above, the next 144 bits output from the pseudorandom sequence generator 160 form the first ranging code in the selected group. When a ranging code has been generated, the process passes to step 200, in which it is determined whether all of the ranging codes in the second group have been generated. If not, the process returns to step 198, in which the next 144 bits are output from the pseudorandom sequence generator 160 to form the next ranging code in the second group, and then to step 200.

When it is determined in step 200 that the second group is complete, that is, that all of the codes in that group have been generated, then the process passes to step 202, and ends.

It should be noted that, although the process of FIG. 5 is intended for use in the base station of a mobile communications system, the procedures of FIGS. 7 and 8, for generating ranging codes in an efficient manner, can also be performed in a mobile communications device, for example such as a laptop computer having wireless connectivity, in order to generate the required ranging codes.

Returning now to the description of FIG. 5, it was mentioned above that, in step 104 of the method, one of the possible transmitted ranging codes is generated, and this is done using the methods described above.

In each subcarrier of the subchannel, the received frequency domain signal R(k) in the kth subcarrier includes the transmitted ranging code C(k) and the effects of the channel H(k). That is:

$$R(k)=C(k)H(k)\exp[-j2\pi k\Delta n/N].$$

where N is the number of subcarriers, and Δn represents the transmission delay.

In step 104, one of the possible transmitted ranging codes is generated, and, in step 106 of the process, this is autocorrelated with the received frequency domain signal R(k). At this stage, it is of course not known whether the generated ranging code is in fact the transmitted ranging code C(k). However, if the generated ranging code is in fact the transmitted ranging code C(k), the result of the autocorrelation in step 106 is given by:

$$C(k)R(k)=H(k)\exp[-j2\pi k\Delta n/N]$$

It will be noted that the result of this calculation varies with the subcarrier number k. In step 108, this effect is removed by multiplying the result of the autocorrelation step for the kth subcarrier with the result for an adjacent (k−1)th subcarrier in the ranging channel.

The result S(k) of this multiplication is therefore:

$$S(k) = C(k)R(k)(C(k-1)R(k-1))*$$
$$= H(k)H*(k-1)\exp[-j2\pi\Delta n/N]$$

Thus, assuming that the channel is constant over the two subcarriers, the result S(k) of the multiplication in step 108 is dependent only on Δn.

In step 110, this process is repeated across the ranging channel. That is, the autocorrelation of step 106 is performed for each subcarrier in the ranging channel, and the multiplication of step 108 is performed for each of the subcarriers in the ranging channel, for which the immediately preceding subcarrier is also in the ranging subchannel. The ranging channel is not contiguous, that is, it does not contain only adjacent subcarriers. The repetitions of step 110 must therefore ensure that the multiplication of step 108 is performed between two adjacent subcarriers.

In step 112, the results of the repeated multiplications are used to detect the transmitted ranging code. This step relies on the fact that, where the autocorrelation of step 106 is performed using a ranging code that is in fact the transmitted ranging code C(k), the result S(k) of the multiplication in step 108 is dependent only on Δn. This means that the results of the repeated multiplications performed in step 110 will in that event tend to be similar to each other. In step 112, it is determined whether the results of the repeated multiplications performed in step 110 are sufficiently similar to lead to a conclusion that the ranging code in use is the transmitted ranging code.

This can be carried out by performing steps 106, 108 and 110 for all possible ranging codes, and then selecting a ranging code as the most likely transmitted ranging code, or by performing steps 106, 108 and 110 for possible ranging codes until one of them meets some threshold, at which point it is selected as the most likely transmitted ranging code without testing the other possible ranging codes.

Figure 9:
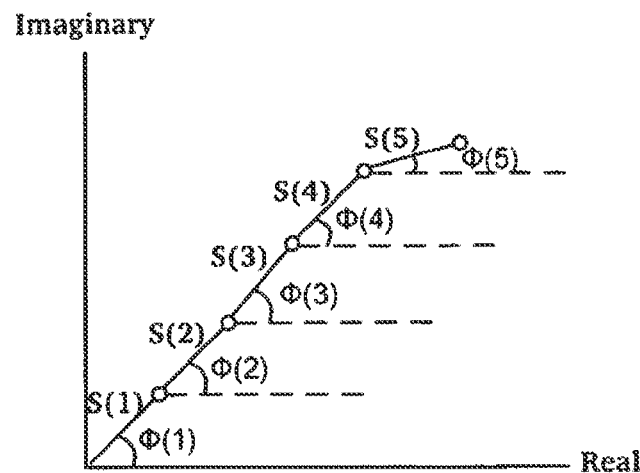
FIG. 9 illustrates the results of a stage in the process of FIG. 5.

FIG. 9 is a representation of the results of the multiplication of step 108, for one particular possibly transmitted ranging code. In FIG. 9, the complex numbers S(1), S(2), ..., S(5), having the arguments Φ(1), Φ(2), ..., Φ(5) respectively, are shown plotted in the complex plane. This assumes that there are five pairs of adjacent subcarriers on which the multiplication of step 108 can be performed. It will be appreciated that any number of such pairs may be used in practice.

As mentioned above, where the autocorrelation of step 106 is performed using a ranging code that is in fact the transmitted ranging code C(k), the result S(k) of the multiplication in step 108 is dependent only on Δn, and so the results of the repeated multiplications performed in step 110 will tend to be similar to each other. This will have the consequence that the arguments Φ(1), Φ(2), ..., Φ(5) will tend to be similar to each other, and this in turn will have the consequence that the overall magnitude of the sum of the results S(1), S(2), ..., S(5) will tend to be relatively large, compared with the power of the received signals.

Thus, one possibility for detecting the code in step 112 is to select the possible ranging code which gives the largest value for this overall magnitude M:

$$M = \left|\sum_{n=1}^{5} S(n)\right|$$

Another possibility is to examine the variance of the arguments Φ(1), Φ(2), ..., Φ(5), and to select the possible ranging code which gives the smallest value for this variance V:

$$V=\mathrm{var}(\arg(S(n)))$$

Alternatively, it is possible to select a possible ranging code for which the variance V is below a threshold.

In step 114, when the most likely candidate for the transmitted ranging code has been selected, the previously obtained results for that ranging code are now used to determine the timing offset.

Figure 10:
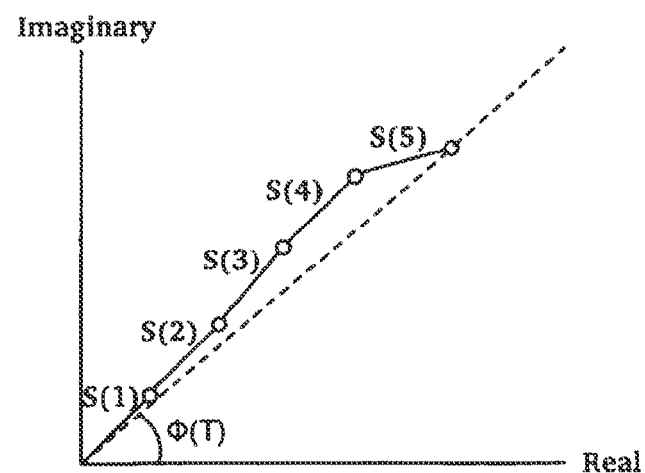
FIG. 10 illustrates the results of a second stage in the process of FIG. 5.

As noted above, the argument of the result S(k) of the multiplication in step 108 is dependent on Δn. The value of Δn is directly related to the timing offset Δt. FIG. 10 is therefore a repeat of the plot of FIG. 9. Again, there are at least two possible ways in which these results can be used to obtain a value for the timing offset.

Firstly, the results S(1), S(2), ..., S(5) can be summed as shown in FIG. 10, with the value for the timing offset being derived from the argument Φ(T) of their sum. That is:

$$\Delta t = f\left(\arg\left(\sum_{n=1}^{5} S(n)\right)\right)$$

Alternatively, the value for the timing offset can be derived from the mean of the arguments Φ(1), Φ(2), ..., Φ(5). That is:

$$\Delta t = f\left(\frac{\sum_{n=1}^{5}\Phi(n)}{5}\right) = f(\mathrm{mean}(\arg(S(n))))$$

There is thus described a method for determining the time offset using the received ranging code.

It should be noted that, in some cases, the base station 10 will have multiple antennas, or, put another way, the antenna 11 shown in FIG. 1 may be made up of multiple antenna elements. In that case, it is possible to detect a separate received signal from each of the antenna elements.

In accordance with an embodiment of the invention, each of these separate received signals is transformed into the frequency domain, and correlated in turn with each of the possible ranging codes, as described above with reference to steps 100-110 of the process shown in FIG. 5. Then, in order to perform the determination described with reference to step 112 of the process shown in FIG. 5, the results of the repeated multiplications performed in step 110 are combined. That is, for each of the possible ranging codes, a single complex number is formed, by adding together the results obtained for each of the pairs of adjacent subcarriers in each of the separate received signals.

As before, the ranging code can be selected that gives the largest value for the magnitude of the overall result, or which first meets some predetermined magnitude criterion, or which has the smallest variance between the arguments of the components of the complex number, or which first meets some predetermined variance criterion.

Combining the results in this way is an efficient way of making use of all available information to detect the ranging code, without requiring additional hardware.

Where the time offset may be greater than one OFDM symbol period, the methods described above can be performed over three correlation windows, overlapping with three consecutive received symbols. The following table shows the correlation outputs during those three correlation windows, depending on the relationship between the timing offset $\Delta t$, the OFDM symbol period $t_s$, and the cyclic prefix $t_{cp}$.

| | Correlation window | | |
|---|---|---|---|
| Delay | 1 | 2 | 3 |
| $0 \leq \Delta t < t_{cp}$ | high | high | low |
| $t_{cp} \leq \Delta t < t_s$ | low | high | low |
| $t_s \leq \Delta t < t_s + t_{cp}$ | low | high | high |
| $t_s + t_{cp} \leq \Delta t < 2t_s + t_{cp}$ | low | low | high |
| $2t_s + t_{cp} \leq \Delta t < 3t_s$ | low | low | low |

When the time offset has been determined, it may also be necessary to compensate for any difference between the frequencies on which the subscriber station is transmitting and the frequencies generated in the base station itself.

In some cases, this correction for carrier frequency offset will have been performed before ranging occurs. However, the results of the method described above can also be used to calculate the carrier frequency offset, or to refine a previous calculation of the carrier frequency offset.

Specifically, in step 116 of the process shown in FIG. 5, the carrier frequency offset can be calculated from the previously determined results.

Once the transmitted ranging code has been detected, in step 112 above, it is possible to determine the timing offset in that particular received signal. Then, it is possible to perform a time domain correlation of the received signal with a delayed version of itself at one time instant only, corresponding to the detected timing offset. This exploits the fact that the code is repeated during initial ranging, and that, therefore, autocorrelation of one symbol with the next will have a phase equal to the phase shift over one symbol. This therefore allows the carrier frequency offset to be determined.

As an alternative to this, once the ranging code has been detected, and the timing offset has been determined, it is possible to perform a time domain correlation of the received signal with a time domain version of the ranging code at one time instant only, corresponding to the detected timing offset. As the time domain version of the ranging code should be free of noise, this should improve the performance.

As a further alternative, instead of determining the timing offset and then performing the time domain correlation at only one time instant, corresponding to the detected timing offset, it is possible to perform a time domain correlation of the received signal with a delayed version of itself for all received samples, and then store the results. Then, when the transmitted ranging code has been detected, and the timing offset has been determined, it is possible to determine which of the stored results should be used to determine the carrier frequency offset, based on the detected timing offset.

In the case of this further alternative, the results of the time domain correlations can be used to help provide a more accurate detection of the timing offset. The time domain correlation will include peaks corresponding to the ranging codes, but cannot be used on its own as a measure of the timing offset because there is no mechanism for determining which of the peaks is associated with any particular ranging code (and hence with any particular user). However, if one of the peaks in the frequency domain correlation is close to one of the peaks in the time domain correlation, it is very likely that they are associated with the same ranging code, and hence with the same user. Then, the positions of the two peaks can be used together to generate a final value for the timing offset. For example, a value intermediate the positions of the two peaks can be used as a final value.

There are therefore described methods allowing reception of signals, which can be implemented efficiently, while providing good results.

The invention claimed is:

1. Circuitry for generating a plurality of ranging codes, the circuitry comprising:
   shift register circuitry;
   receiver circuitry configured to receive a ranging code;
   identification circuitry configured to identify a group type associated with the received ranging code based, at least in part, on whether the received ranging code is received during a time slot reserved for the identified group type;
   sequence retrieval circuitry configured to:
      receive an initial sequence corresponding to the identified group type; and
      apply the initial sequence to the shift register circuitry; and
      after applying the initial sequence to the shift register circuitry, provide an input signal to the shift register circuitry at a plurality of time instants, wherein a value of the input signal at a time instant of the plurality of time instants is based on a plurality state values in the shift register circuitry at a previous time instant; and
   clocking circuitry configured to clock the shift register circuitry at the plurality of time instants to output, in a consecutive sequence, the plurality of ranging codes corresponding to the identified group type.

2. The circuitry of claim 1, wherein the group type is one of an initial ranging code type, a periodic ranging code type, a bandwidth request type, and a handover ranging code type.

3. The circuitry of claim 1, wherein the shift register circuitry comprises fifteen flop-flop circuits.

4. The circuitry of claim 1, wherein:
   the shift register circuitry is a linear feedback shift register circuitry; and an output of an OR circuit is applied as an input to the linear feedback shift register circuitry, wherein the OR circuit receives as input four bit values from a previous state of the linear feedback shift register circuitry.

5. The circuitry of claim 1, wherein:
a data storage circuitry is configured to store a plurality of initial sequences including the initial sequence corresponding to the identified group type; and
the plurality of initial sequences depend on a base station identifier associated with the receiver circuitry.

6. The circuitry of claim 1, wherein the sequence retrieval circuitry is configured to:
determine if each ranging code in the plurality of ranging codes corresponding to the identified group type has been output by the shift register circuitry;
determine a next group type if each ranging code in the plurality of ranging codes corresponding to the identified group type has been output;
retrieve, from a data storage circuitry, a next sequence corresponding to the next group type; and
apply the next sequence to the shift register circuitry.

7. A method for generating a plurality of ranging codes, the method comprising:
receiving a ranging code;
identifying a group type associated with the received ranging code based, at least in part, on whether the received ranging code is received during a time slot reserved for the identified group type;
receiving an initial sequence corresponding to the identified group type;
applying the initial sequence to a shift register;
after applying the initial sequence to the shift register, provide an input signal to the shift register at a plurality of time instants, wherein a value of the input signal at a time instant of the plurality of time instants is based on a plurality state values in the shift register at a previous time instant; and
clocking the shift register at the plurality of time instants to output, in a consecutive sequence, a plurality of ranging codes corresponding to the identified group type.

8. The method of claim 7, wherein the group type is one of an initial ranging code type, a periodic ranging code type, a bandwidth request type, and a handover ranging code type.

9. The method of claim 7, wherein the shift register comprises fifteen flop-flop circuits.

10. The method of claim 7, wherein the shift register is a linear feedback shift register, and further comprising applying an output of an OR circuit as an input to the shift register, wherein the OR circuit receives as input four bit values from a previous state of the shift register.

11. The method of claim 7 further comprising storing a plurality of initial sequences including the initial sequence corresponding to the identified group type, wherein the plurality of initial sequences depend on a base station identifier.

12. The method of claim 7 further comprising:
determining if each ranging code in the plurality of ranging codes corresponding to the identified group type has been output by the shift register;
determining a next group type if each ranging code in the plurality of ranging codes corresponding to the identified group type has been output;
retrieving, from a memory, a next sequence corresponding to the next group type; and
applying the next sequence as an input to the shift register.

13. A system for generating a plurality of shift register initialization codes, the system comprising a calibration unit configured to:
initialize a shift register by applying an initialization code to the shift register;
clock the shift register to produce a consecutive sequence of output ranging codes; and
for each ranging code in the consecutive sequence of output ranging codes:
determine a type associated with the ranging code and whether the ranging code is a first ranging code of the determined type in the consecutive sequence;
store a state of the shift register corresponding to the ranging code in response to a determination that the ranging code is the first ranging code of the determined type in the consecutive sequence; and
bypass the ranging code without storing the state of the shift register corresponding to the ranging code in response to a determination that the ranging code is not the first ranging code of the determined type in the consecutive sequence.

14. The system of claim 13, wherein the determined type is one of an initial ranging code type, a periodic ranging code type, a bandwidth request type, and a handover ranging code type.

15. The system of claim 13, wherein a memory is configured to store a state of the shift register corresponding to each of an initial ranging code type and a handover ranging code type.

16. The system of claim 13, wherein the calibration unit is configured to perform the initializing, the clocking, the determining, and the storing automatically in response to a device power-up signal.

17. The system of claim 13, wherein the calibration unit is configured to clock the shift register, at least in part, by applying four bits from a previous state of the shift register to an OR circuit.

18. The system of claim 13, wherein the initialization code is based, at least in part, on a base station identifier.

* * * * *